Feb. 24, 1970  J. W. ROSENKRANDS  3,497,025
SEMI-SPRUNG REAR ENGINE DRIVING AGGREGATE
Filed April 25, 1968
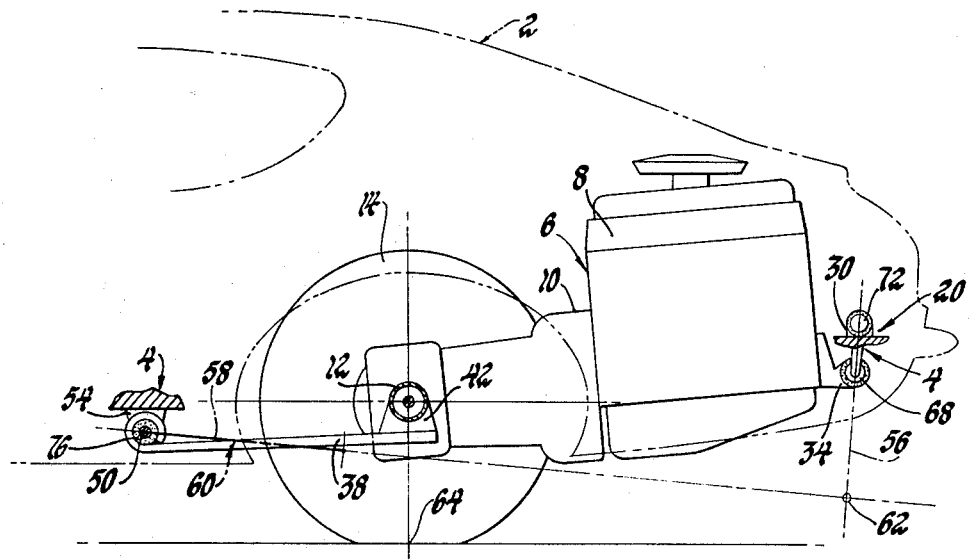
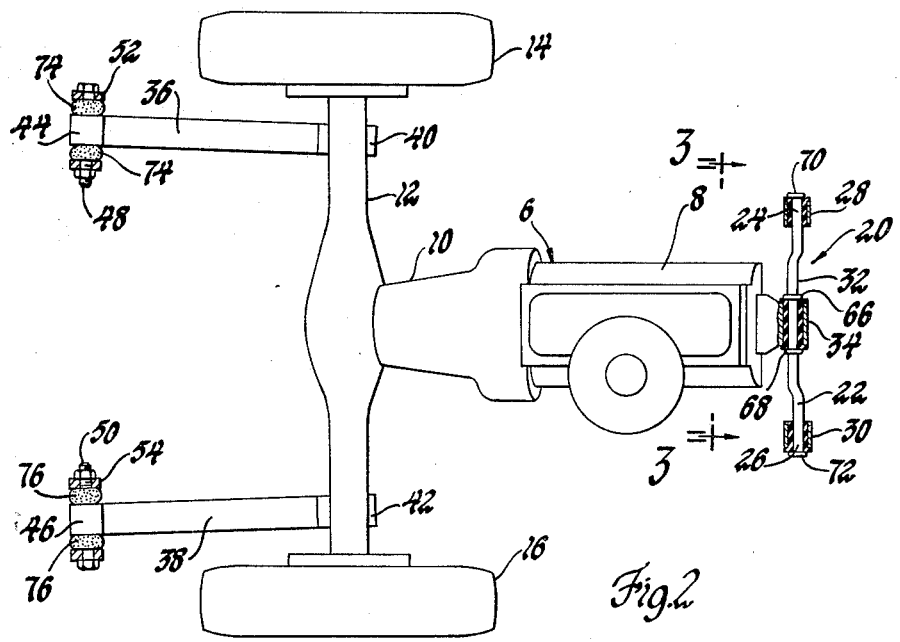
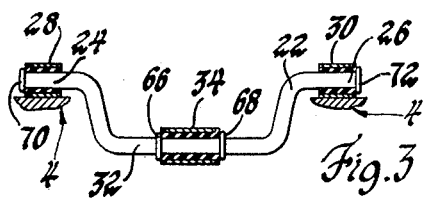
INVENTOR.
John W. Rosenkrands
BY
W. F. Wagner
ATTORNEY

United States Patent Office 3,497,025
Patented Feb. 24, 1970

3,497,025
SEMI-SPRUNG REAR ENGINE DRIVING AGGREGATE
John W. Rosenkrands, Detroit, Mich., assignor to General Motors Corporation, Detroit, Mich., a corporation of Delaware
Filed Apr. 25, 1968, Ser. No. 724,172
Int. Cl. B60k 9/00
U.S. Cl. 180—56                    2 Claims

ABSTRACT OF THE DISCLOSURE

A rear engine vehicle in which the engine, transmission and driving wheel supporting axle form a close-coupled generally T-shaped rigid unit with the axle disposed forwardly of the engine. The unit is articulatably and elastically supported on the vehicle so that vertical deflection of the former occurs about an instantaneous virtual center imparting longitudinal components of movement to the wheels effective to diminish acceleration squat. Additionally, during conditions of lateral acceleration, the unit is capable of limited yaw deflection providing rear wheel understeer.

---

This invention relates to vehicle suspension and more particularly to improved suspension for vehicles of the type utilizing a rear engine unitary driving aggregate.

Rear engine drive vehicles are well known in the prior art. Among the numerous forms previously proposed is the arrangement wherein the engine, transmission and wheel supporting axle form an essentially rigid unit hingedly mounted at one end to the vehicle superstructure. Typical of such arrangements is British Patent No. 469,171. As shown in this patent, such an arrangement is susceptible of mounting in both a trailing and a leading fashion; that is to say, with the engine portion of the aggregate trailing the wheels or vice versa. However, in applying the concept to structures utilizing conventional longitudinally oriented in-line engines, the choice of a trailing arrangement involves the serious problem of the engine physically interfering with the passenger carrying portion of the vehicle. On the other hand, with a trailing arrangement utilizing conventional mounting, the vehicle exhibits an undesirable degree of squat during acceleration. The present invention is directed to a trailing arrangement mounted in a manner effective to reduce the acceleration squat tendency.

An object of the invention is to provide an improved rear engine drive vehicle.

Another object is to provide a rear engine drive vehicle in which the engine, transmission, driving axle and wheels form a close-coupled essentially rigid unit with the engine disposed rearwardly of the wheel centerline.

A further object is to provide in a construction of the stated character suspension geometry capable of significantly reducing vehicle squat during acceleration.

A still further object is to provide a structure of the stated character including lateral acceleration responsive means for generating rear wheel understeer.

The foregoing and other objects, advantages and features of the invention will become more readily apparent as reference is had to the accompanying specification and drawing wherein:

FIGURE 1 is a fragmentary side elevational view, partly in section, illustrating a vehicle construction in accordance with the invention;

FIGURE 2 is a fragmentary plan view of the construction shown in FIGURE 1; and

FIGURE 3 is a view looking in the direction of arrows 3—3 of FIGURE 2.

Referring now to the drawing and particularly FIGURES 1 and 2, there is shown a rear engine drive vehicle in which the reference numeral 2 generally designates the body portion of the sprung mass 4, beneath the rearward portion of which is disposed a generally T-shaped rigid driving aggregate 6 comprising an in-line upright engine 8, a transmission 10 longitudinally aligned with the engine, and a transversely extending rigid axle housing 12 having driving wheels 14 and 16 rotatably supported at opposite ends thereof. The rearward end of the engine is pivotally connected to the rearward extremity of the sprung mass by a shackle type hinge assembly 20. As seen best in FIGURE 2, assembly 20 includes a generally U-shaped transversely extending bar 22 of round cross section having laterally aligned opposite extremities 24 and 26 rotatably supported in elastic bushings 28 and 30 formed on sprung mass 4. The intermediate portion 32 of bar 22 is downwardly offset from the common axis of the lateral extremities 24 and 26 and extends through a bushing member 34 secured to the rearward extremity of the engine.

Extending forwardly from axle 12 in laterally spaced relation are a pair of cantilever leaf springs 36 and 38. At their rearward extremities, springs 36 and 38 are rigidly connected to depending brackets 40 and 42 formed on axle 12 while their forward extremities are formed with spring eyes 44 and 46 which surround pivot pins 48 and 50 supported on depending brackets 52 and 54 formed on the sprung mass 4. Springs 36 and 38 thus cooperate with the shackle type hinge 20 to longitudinally align the driving aggregate relative to the sprung mass as well as providing the elastic medium for yieldably supporting the sprung mass relative to the wheels.

According to the principal feature of the invention, the cantilever leaf springs 36 and 38 and the shackle type hinge assembly 20 are also oriented so as to provide an instantaneous virtual center of swinging movement of the unit which is effective to diminish the tendency of the sprung mass to squat during acceleration, in comparison to conventional rearwardly disposed fixed pivot connections utilized in the prior art.

As seen in FIGURE 1, the instantaneous virtual center is established by the intersection of the plane 56 of the bar member 22 with the plane 58 of the link equivalents 60 of cantilever leaf springs 36 and 38. Hence, with the sprung mass at design height, the instantaneous center height is located at 62. Thus, the virtual center of vertical swinging movement of the unit is substantially below the lowest center which could be achieved by prior art fixed pivot arrangements mounted on any practical physical location on the sprung mass. Since the acceleration squat tendency of the sprung mass is proportional to the degree of forward movement exhibited by the wheel contact 64 (the point or spot on the wheel engaging the road) during upward deflection of the unit, while the degree of forward movement progressively increases with increase in the height of the center of swinging movement above the wheel contact spot, it will be evident that the low virtual center of swinging movement provided by the present invention materially reduces acceleration squat.

According to another feature of the invention, the bar 22 is dimensioned in cross section and mounted at sufficiently widely spaced points by bushings 28 and 30 so that the intermediate portion 32 acts both as a hinge axis and as a spring mounting for the engine end of the aggregate.

According to a further feature of the invention, the cantilever leaf springs and shackle type hinge are mounted in a manner whereby, under conditions of lateral acceleration of the vehicle, the unit 8 is capable of yawing movement in a direction inducing a controlled degree of rear wheel understeer. As seen particularly in FIGURE 2, the bushing 34 at the rearward end of unit 8 is restrained against lateral movement on bar 22 by flange elements 66 and 68 while the bar in turn is restrained laterally by end flanges 70 and 72. In contrast, the spring eyes 44 and 46 at the forward ends of cantilever leaves 36 and 38 are relatively yieldably restrained against lateral movement by annular elastic elements 74 and 76. In consequence, when the vehicle is subject to lateral acceleration such as occurs during turning movement, the tendency of the sprung mass to move toward the outboard side of the turn is accompanied by a corresponding movement of the shackle type hinge and engine end of the unit. However, since the wheels 14 and 16 tend to resist movement in the outboard direction due to frictional engagement with the ground, the entire unit tends to yaw in the direction of the turn about an imaginary vertical axis passing through the bushing 34, to the degree permitted by the lateral flexibility of the elastic elements 74 and 76, thus producing a steering angle for the rear wheels which tends to steer the vehicle out of the turn initiated by the steering angle applied to the front wheels, the condition commonly referred to as rear wheel understeer. Naturally, as soon as the influence of lateral acceleration on the sprung mass ceases, i.e., when the vehicle returns to the straight path of movement, the elastic elements 74 and 76 tend to restore the spring eyes 44 and 46 to their normal lateral positions thus returning the unit to normal alignment. The rear wheels then resume rotation in planes parallel with the center line of the vehicle and, therefore, restore neutral rear wheel steer.

From the foregoing, it will be seen that a novel and improved semi-sprung driving aggregate for vehicles has been devised which enables disposition of the engine rearwardly of the wheels so that no undesirable interference with the passenger carrying compartment of the vehicle is required, and additionally provides desirable rear wheel steer responsive to lateral acceleration.

Having thus described the invention, what is claimed is:

1. In a motor vehicle, a body, a unit drive assembly comprising, an engine and a transmission rigidly connected in longitudinal alignment with laterally opposite driving wheels supported on a transverse axle housing rigidly connected to said transmission, shackle means connecting the engine end of said unit to said body adjacent one longitudinal extremity thereof, said shackle means including a pair of spaced axes defining a generally vertical transverse plane, laterally spaced link means each connected at one end to said body and at the other end to the opposite end of said unit, each said link forming generally along its length between such connections an effective axis lying within and defining with such effective axis of the other link a generally horizontal transverse plane, the intersection of said planes defining an instantaneous virtual center of vertical swinging movement of said unit rearwardly of said wheels and substantially below the lowermost extremity of said body effective to reduce the tendency of the rear end of said body to squat during acceleration, the connections of said one ends of said link means to the body including elastic members enabling limited yieldable lateral deflection, said shackle means being formed and arranged to resist lateral deflection of the adjacent end of said unit, and means elastically supporting said body relative to said wheels.

2. The invention of claim 1 wherein said link means comprise laterally spaced cantilever leaf springs anchored at their rearward ends on said axle housing and pivotally connected at their forward ends to said body.

References Cited

UNITED STATES PATENTS 3,115,206 12/1963 Renner _____ 180—64 XR
3,327,803 6/1967 Cote et al. _____ 180—64 XR

FOREIGN PATENTS 586,366 1/1925 France.
430,977 6/1935 Great Britain.
469,171 7/1937 Great Britain.

LEO FRIAGLIA, Primary Examiner

MILTON L. SMITH, Assistant Examiner